Feb. 20, 1951          H. O. HEDGES          2,542,410
MOTOR VEHICLE CONTROL MECHANISM
Filed March 7, 1947          3 Sheets-Sheet 1
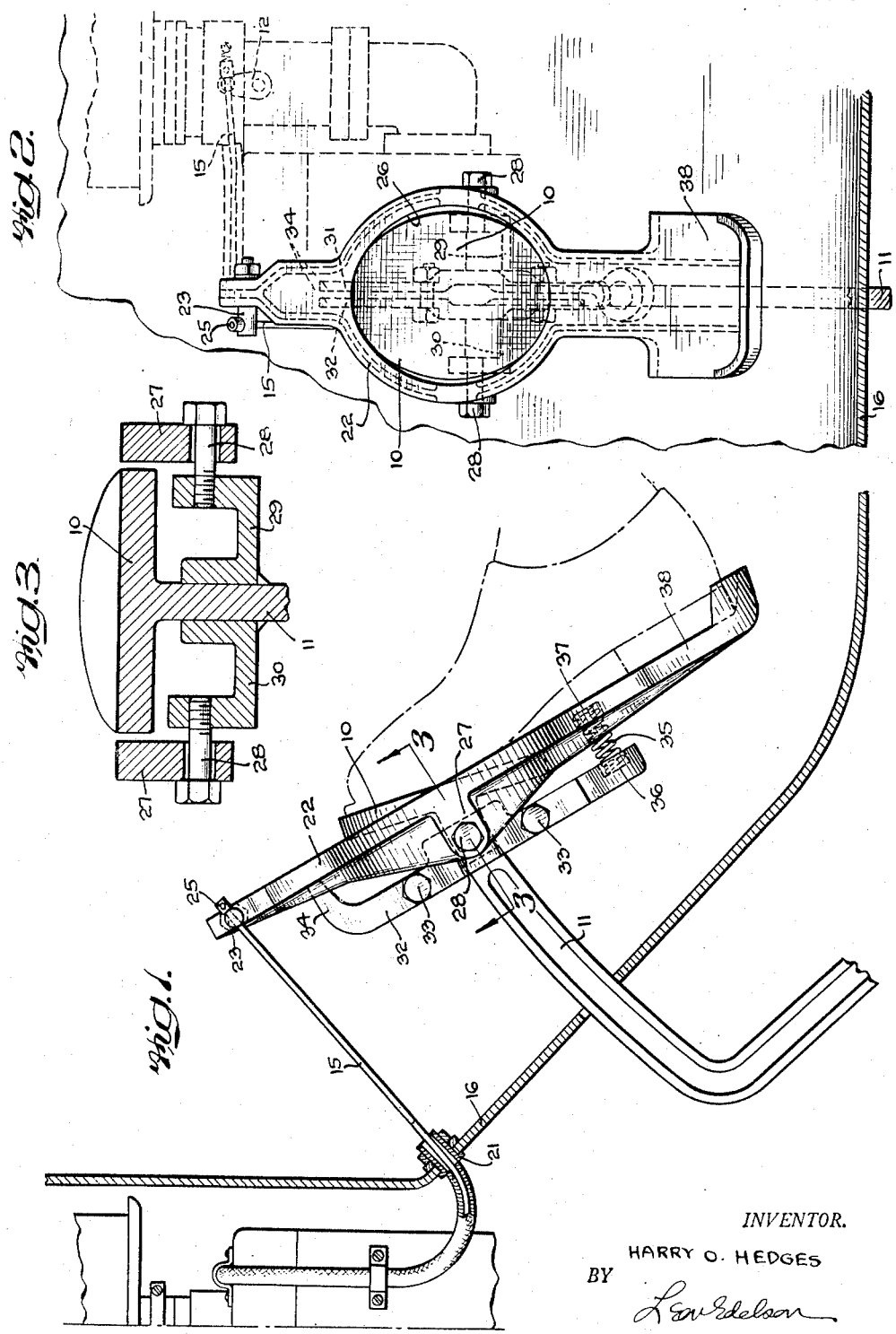
*INVENTOR.*
HARRY O. HEDGES
BY
*Lew Edelson*
*ATTORNEY*

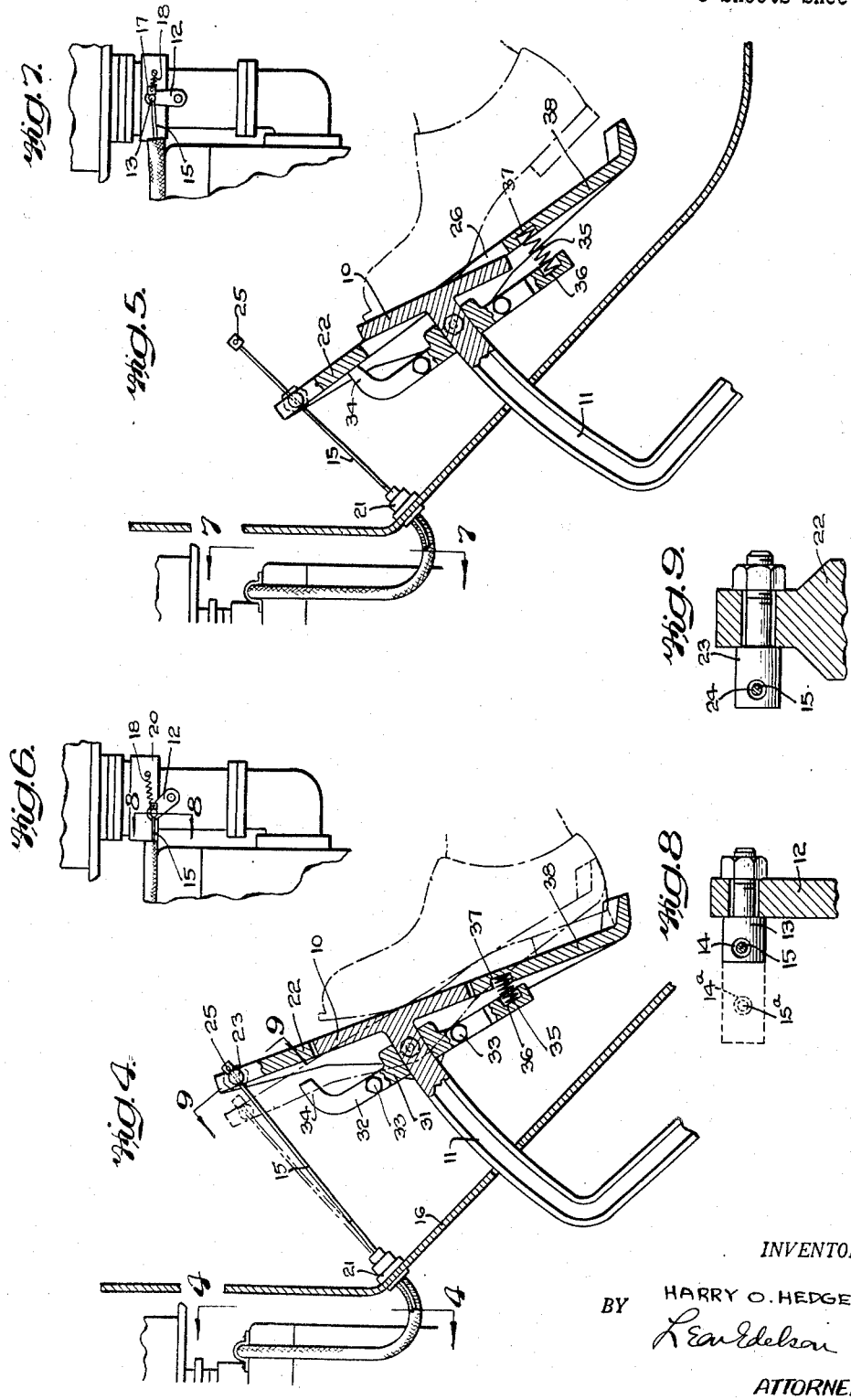

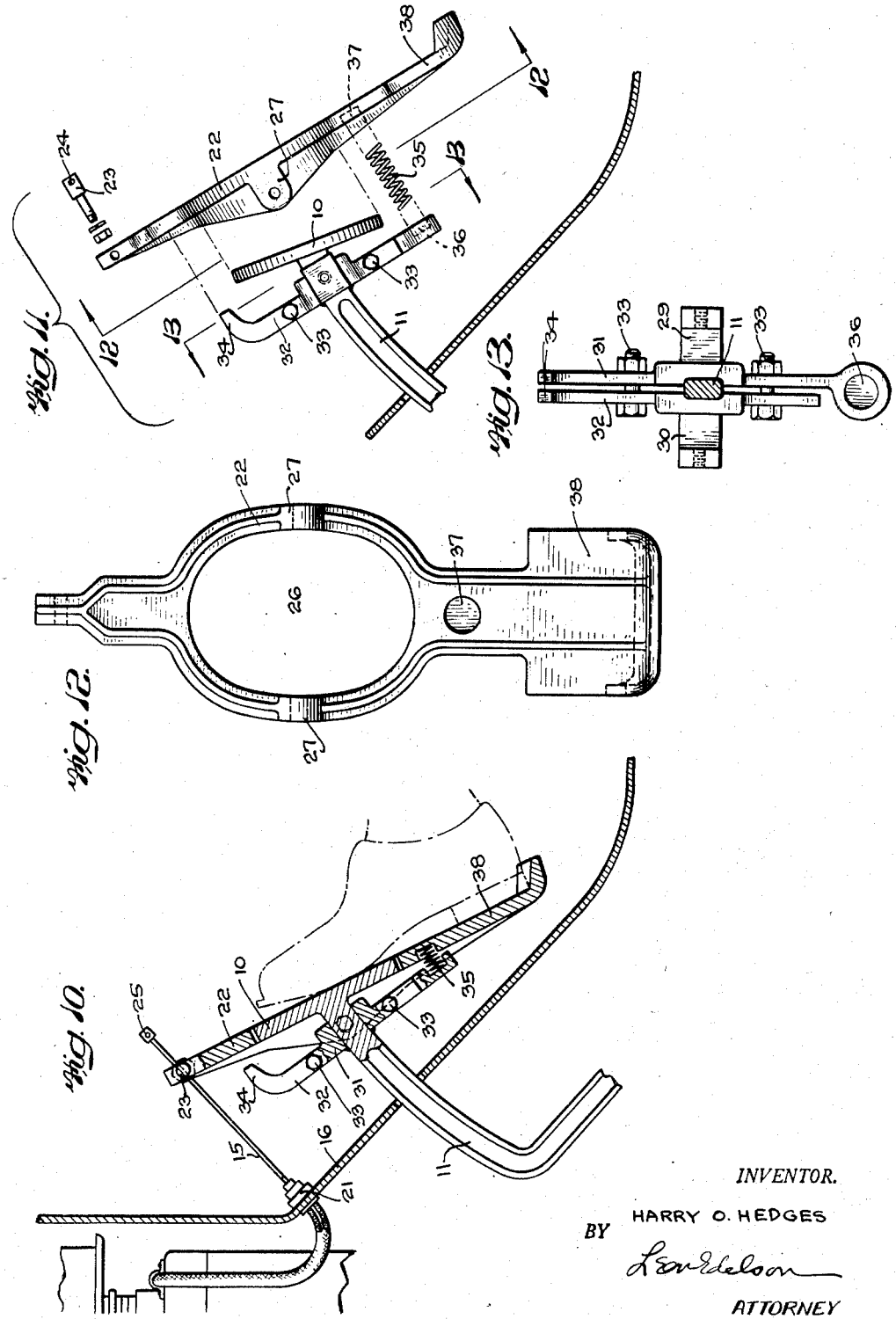

Patented Feb. 20, 1951

2,542,410

UNITED STATES PATENT OFFICE 2,542,410

MOTOR VEHICLE CONTROL MECHANISM

Harry O. Hedges, Seattle, Wash., assignor to The Tabor Manufacturing Company, Philadelphia, Pa., a corporation of Pennsylvania Application March 7, 1947, Serial No. 733,259

1 Claim. (Cl. 192—3)

The present invention relates to motor vehicle control mechanism and more particularly to a novel inter-related brake pedal and accelerator pedal.

In vehicle controls as heretofore in use, it is the common practice to operate the brake pedal with one foot and the accelerator with the same foot, shifting from one to the other as occasion demands. Thus, in driving a motor vehicle, a foot normally rests upon and controls the throttle or accelerator pedal until such time as it becomes necessary to operate the brake, whereupon the throttle foot must shift to the brake pedal to retard or bring the vehicle to a stop. This type of operation introduces a hazard because in an emergency many drivers become confused and, instead of lifting the foot from the accelerator pedal, excitedly press down thereon to cause the vehicle to crash into whatever the driver intended to avoid.

In some instances single pedal controls have been tried, but have been found impractical due to confusion of the operator in trying to select the proper operation, or in other instances simultaneously actuating both controls.

Some of the objects of the present invention are: to provide an improved combined brake and throttle control for a motor vehicle; to provide a dual control for selective operation of either the brake or the throttle by one foot of the operator; to provide a novel brake and accelerator control for motor vehicles wherein accidental operation of the vehicle throttle instead of the brake is effectually prevented; to provide a control mechanism for motor vehicles wherein in all brake-operating positions it is impossible to open the throttle of the motor; to provide a complete unitary accelerator pedal assembly adapted for attachment to the conventional brake lever of a motor vehicle, without requiring any structural changes or modifications of the brake lever or its mounting on the vehicle; and to provide other improvements as will hereinafter appear.

It will be understood that the present invention consists substantially in the combination, construction, location and relative arrangement of parts, all as will appear more fully hereinafter, as shown in the accompanying drawings, and as finally pointed out in the appended claim. In the said accompanying drawings, Figure 1 represents a side elevation of a brake and throttle control mechanism embodying one form of the present invention;

Figure 2 represents a plan of the same;

Figure 3 represents a section on line 3—3 of Figure 1;

Figure 4 represents a side elevation, partly broken away, of the mechanism showing the position of the parts for throttle operation;

Figure 5 represents a side elevation, partly broken away, of the mechanism showing the position of the parts for brake operation;

Figure 6 represents a detail in side elevation of the attachment of the flexible operating shaft to the parts for operating the throttle in the carburetor of a motor and showing the throttle partly open;

Figure 7 represents a section on line 7—7 of Figure 5 showing the throttle in closed position;

Figure 8 represents a section on line 8—8 of Figure 6;

Figure 9 represents a section on line 9—9 of Figure 4;

Figure 10 represents a side elevation, partly broken away, of the mechanism showing both brake and throttle controls inadvertently pushed down and throttle remaining closed;

Figure 11 is an exploded view of the mechanism;

Figure 12 represents a section on line 12—12 of Figure 11; and

Figure 13 represents a section on line 13—13 of Figure 11.

Referring to the drawings, one form of the present invention is shown as operatively associated with a brake pedal 10 formed as a fixed part of the brake lever 11 of a motor vehicle, such parts, as here shown, being the usual brake construction which remains unchanged in structure and in operation by the attachment of the present invention.

As is shown most clearly in Figures 6, 7 and 9, for operating the throttle of a vehicle, the throttle lever 12, operatively associated in conventional manner with the vehicle carburetor, is fitted with a laterally projecting pin 13 having a transversely extending through-hole 14 to allow free passage therethrough of the flexible throttle-actuating shaft 15 which extends through the floor-board 16 of the vehicle for operative connection to the accelerator pedal, as will be described hereinafter. The throttle end of this shaft 15 terminates in an enlarged thrust head 17 against which the pin 13 is normally biased by a spring 18 tensioned between the lever 12 and a fixed part of the vehicle, such as the carburetor casing 20. Thus, a lost motion connection is provided which in throttle closing position of the lever 12 allows the shaft 15 to move relative thereto and prevent deforming or bending of the shaft 15. As here shown, the shaft 15 passes by way of a bushing 21 into position for attachment to the accelerator pedal 22. For such latter attachment, as shown in Figure 9, the accelerator pedal 22 is also provided with a laterally extending pin 23 having a transversely extending aperture 24 through which the shaft 15 passes, the inner end of the shaft terminating in an enlarged head 25 which normally abuts the pin 23 under the biasing action of the throttle closing spring 18.

As a means for operatively associating the accelerator pedal 22 with the brake control, said pedal is provided with a central body portion having an opening 26 to freely receive therein the brake pedal 10, such opening being straddled by a pair of ears 27 which respectively provide rearwardly extending trunnion bearings for a pair of axially alined pivot studs 28—28 for pivotal support of the accelerator pedal upon the brake lever 11. These studs 28—28 are respectively secured to opposite side extensions 29—30 of a bracket assembly formed of a pair of elongated parts 31 and 32 clamped together about the brake lever 11 by bolts 33. As secured in place, this bracket assembly is in medial alinement with the accelerator pedal 22 and projects upwardly beyond the central opening 26 of said pedal so as to provide a stop 34 to limit rocking movement of the pedal 22 about its pivot studs 28—28 under the biasing action of a compression spring 35 compressed between a socket 36, formed in the lower end portion of the bracket assembly, and a like socket 37 formed in the rear face of the accelerator pedal 22. The spring 35 is so relatively located as to normally exert a bias upon the pivoted accelerator pedal 22 which tends to rock the latter in counter-clockwise direction about its pivot studs 28—28 (see Figures 1, 4 and 10), it being noted in this connection that the accelerator pedal is thus adapted for rocking motion relatively to the brake pedal 10 and its lever 11. The lower end portion of the accelerator pedal 22 extends beyond the biasing spring 35 to form a heel rest 38 for rocking the pedal 22, said rest being flanged and properly contoured to adequately support the heel of the operator's foot.

In describing the operation of the device, reference will be made first to Figure 1 wherein the parts hereinbefore described are shown in their normal inoperative position with the accelerator pedal 22 biased by the spring 35 against the relatively fixed stop 34, and with its central opening 26 embracing the brake pedal 10. In this condition of the parts, the throttle spring 18 tensions the flexible shaft 15 so that its terminal head 25 abuts against the pin 23 of the accelerator pedal 22. In this position the foot of the operator rests naturally upon the pedal 22 with the ball of the foot in contact with the brake pedal 10 and the heel supported by the flanged rest 38.

When it is desired to start and drive the vehicle, the operator presses his heel downward to rock the accelerator pedal 22 about its pivot studs 28—28, as shown in Figure 4, whereupon the thrust of the pin 23 against the terminal head 25 of the flexible shaft 15 pulls the shaft in the direction to open the throttle to start the motor and maintain it running at speeds determined by the angular displacement of the accelerator pedal 22 about its pivot pins relatively to the brake pedal 10.

When it is desired to bring the vehicle to a stop, as shown in Figure 5, the heel of the operator is lifted in the act of pressing the ball of the foot on the pedal 10 whereupon the spring 35 reacts to rock the pin 23 of the accelerator pedal 22 away from the terminal head 25 of the shaft 15, whereupon the shaft is retracted under the pull of the spring 18 upon the throttle lever 12 to close the throttle.

Figure 10 shows the relative positions assumed by the several parts when the operator by mistake presses down on both the brake pedal 10 and the accelerator pedal 22. Inasmuch as the accelerator pedal is pivoted upon the brake pedal lever, any depression of the brake pedal effects corresponding depression of the accelerator pedal with consequent shifting of the latter lengthwise of the throttle-actuating shaft 15 and away from its terminal head 25. Consequently, upon depression of the brake pedal, the throttle-actuating shaft 15 remains unaffected by the accelerator pedal even though the latter be swung about its pivot against the bias of the spring 35. In this connection, it will be observed that the pin 23 through which the throttle-actuating shaft 15 projects is free to oscillate about its axis relatively to the accelerator pedal 22 so as to preclude any possibility of the flexible shaft 15 becoming bound with respect to the pin 23 as the latter is shifted along the shaft 15.

It will now be apparent that a complete unitary assembly has been devised for attachment to the brake lever of a motor vehicle, such assembly including an accelerator pedal, a throttle control mechanism, and a support for pivotally mounting the pedal in attached position on a brake lever. When so attached the combined brake and attached pedal assembly provides selective operation of the brake and throttle mechanism, such operation being governed by the attitude of the foot of the user upon the two pedal controls. Thus, the present invention makes it impossible for a user to inadvertently operate a throttle mechanism in place of operating the brake and thereby eliminates dangers and disadvantages inherent in two separate and independently operated controls.

As has already been indicated, the device of the present invention is adapted for ready installation in the vehicle without requiring any structural modification of or substitution for the conventional brake pedal and lever assembly now in general use. And, if desired, the present invention may be employed as an auxiliary to, instead of as a replacement of, the conventional accelerator pedal. In such case, it is merely necessary to replace the pin 13 extending laterally of the throttle-actuating lever 12 with a longer pin, as shown in dotted lines in Figure 8, having a pair of transversely extending openings 14 and 14ª for respective projection therethrough of a pair of throttle-actuating shafts 15 and 15ª, the shaft 15 being operatively connected as hereinbefore described to the accelerator pedal 22 of the present invention and the shaft 15ª to the conventional accelerator pedal (not shown) of the vehicle. Thus, either accelerator pedal may be employed, as desired, to actuate and control the operation of the throttle lever 12.

It will be understood, of course, that the present invention is susceptible of various other changes and modifications which may be made from time to time without departing from the real spirit or general principles of the invention, and it is accordingly intended to claim the same broadly as well as specifically as indicated in the appended claim.

What is claimed to be new and useful is:

A throttle control attachment adapted to be mounted upon the brake pedal lever of a motor vehicle comprising a throttle control mechanism, spring means normally holding said control mechanism in closed throttle position, an accelerator pedal having an opening therein for such accommodation of the vehicle brake pedal as to permit substantial coplanar disposition of said accelerator and brake pedals, means for mounting said accelerator pedal for pivotal movement relatively to said brake pedal, one end of said accelerator pedal being extended for connection to said control mechanism and its opposite end being extended to form a rest designed to receive the heel of an operator's foot when the ball thereof is located directly over the brake pedal, said accelerator pedal having a lost-motion connection with said throttle control mechanism to insure against opening of the latter upon depression of the brake pedal, and means interposed between said accelerator pedal and its mounting for normally biasing said pedal into a position in which said throttle means is ineffective.

HARRY O. HEDGES.

REFERENCES CITED

The following references are of record in the file of this patent:

UNITED STATES PATENTS

| Number | Name | Date |
|---|---|---|
| 1,527,152 | Davis | Feb. 17, 1925 |
| 1,535,866 | Sears | Apr. 28, 1925 |
| 1,549,348 | Davis | Aug. 11, 1925 |
| 1,724,596 | James | Aug. 13, 1929 |
| 2,177,305 | Renner | Oct. 24, 1939 |
| 2,313,000 | Houguel | Mar. 2, 1943 |

FOREIGN PATENTS

| Number | Country | Date |
|---|---|---|
| 272,945 | Great Britain | Dec. 22, 1927 |